3,341,559
17α-HALO-16,20-STEROIDS OF THE PREGNANE AND A-NOR-PREGNANE SERIES AND METHODS FOR THEIR PREPARATION
Saul L. Neidleman, Lawrence Township, Samuel C. Pan, Metuchen, and Patrick A. Diassi, Westfield, N.J., assignors to E. R. Squibb & Sons, Inc., New York, N.Y., a corporation of Delaware
No Drawing. Filed Oct. 22, 1965, Ser. No. 502,443
16 Claims. (Cl. 260—397.3)

This application is a continuation-in-part of application Ser. No. 446,423, filed on April 7, 1965, now abandoned.

This invention relates to new processes for preparing 17α-halo-16,20-diketo steroids and to certain new steroids prepared thereby.

One process of this invention essentially comprises subjecting a 16,20-diketo steroid of the pregnane series (including the pregnene, pregnadiene and pregnatriene series), unsubstituted in the 17-position, under aerobic conditions to the action of a halogenating enzyme and a halide salt in the presence of hydrogen peroxide.

As source of the halogenating enzyme, the microorganism *Caldariomyces fumago* may be used. The microorganism can be grown as a static culture on Czapek-Dox medium at room temperature for 14–20 days. The halogenating enzyme is prepared as a water extract of an acetone powder of the microorganism.

In addition to the halogenating enzyme, hydrogen peroxide must also be present in the reaction mixture. Although hydrogen peroxide itself may be added to the mixture, the hydrogen peroxide may be prepared in situ by use of a peroxide producing enzyme system. Such enzyme systems are well known in the art and include glucose oxidase in the presence of glucose, D- and L-amino acid oxidases in the presence of D- or L-methionine, and diamine oxidase in the presence of histamine. Although substantially any concentration of hydrogen peroxide may be used, preferably the hydrogen peroxide is present in a molar ratio of about 0.1 to 1 to about 100 to 1 (optimally about 1 to 1 to about 10 to 1) based on the weight of the steroid. If a peroxide producing enzyme system is used, the concentration of the enzyme is so adjusted to yield the same concentration of hydrogen peroxide as stated above.

The reaction is preferably conducted at a pH in the range of about 2.2 to about 6 (optimally about 2.2 to about 4 and most advantageously at pH 3.0 in the presence of hydrogen peroxide and about 4 to about 6, most advantageously at pH 5 in the presence of enzymatically produced hydrogen peroxide). To assure that the pH of the reaction mixture is maintained in this range, a buffering agent which buffers in the desired pH range is preferably also added to the reaction medium. Suitable buffers include McIlvaine's buffer, potassium citrate buffer, sodium acetate buffer, potassium phosphate buffer and potassium formate buffer.

The reaction is carried out in an aqueous medium under aerobic conditions, normally at a temperature in the range of about 20° C. to about 30° C. The components of the medium, namely, the steroid, buffering agent, halogenating enzyme, and hydrogen peroxide source are merely mixed with water and the resultant mixture agitated or shaken to assure adequate aeration for about 10 to about 200 minutes (optimally about 30 minutes to about 240 minutes).

Although the halogenating enzyme acts merely as a catalyst and hence can be present in any proportion, to assure maximum conversion of the starting steroid to the desired final product, the enzyme is prepared by grinding the acetone powder of the microorganism with ten times its weight of acid washed sand in distilled water, 20–30 ml./gm. acetone powder, for 2–5 minutes. One milliliter of the extract is used to convert about 1 mg. steroid in the presence of the appropriate additives.

Among the suitable steroid substrates are all steroids of the pregnane series that are unsubstituted in the 17-position and contain keto groups in at least the 16 and 20-positions. Such steroids include 16-ketoprogesterone,
16-keto-A-norprogesterone,
16-keto-1-dehydroprogesterone,
16-keto-6-dehydroprogesterone,
16-keto-11-desoxycorticosterone and 21-esters thereof,
16-keto-1,6-tetradehydroprogesterone,
16-ketopregnenolone,
6α-methyl-16-ketoprogesterone,
6β-chloro-16-ketoprogesterone,
6α-fluoro-16-ketoprogesterone,
9α-halo-11β-hydroxy-16-ketoprogesterones (such as 9α-fluoro-11β-hydroxy-16-ketoprogesterone),
9α-halo-11,16-diketoprogesterones,
9α-halo-11β-hydroxy-16-keto-1-dehydroprogesterones,
9α-halo-11β-hydroxy-16-keto-6-dehydroprogesterones,
6α,9α-dihalo-11β-hydroxy-16-ketoprogesterones,
9α-halo-16-ketocorticosterones and 21-esters thereof (such as 9α-fluoro-16-ketocorticosterone and its 21-acetate),
9α-halo-16-keto-1-dehydrocorticosterones and 21-esters thereof (such as 9α-fluoro-16-keto-1-dehydrocorticosterone and its 21-acetate),
9α-halo-16-keto-6-dehydrocorticosterones and 21-esters thereof,
9α,21-dihalo-11β-hydroxy-16-ketoprogesterones,
9α,21-dihalo-11β-hydroxy-16-keto-1-dehydroprogesterones,
9α,21-dihalo-11β-hydroxy-16-keto-6-dehydroprogesterones,
9α-halo-11β-hydroxy-16-keto-A-norprogesterones,
16-keto-19-norprogesterone,
16-keto-19-norcorticosterone,
6α-halo-11β-hydroxy-16-ketocorticosterones and their 21-esters, and
6α-halo-11β-hydroxy-16-keto-1-dehydrocorticosterones and their 21-esters.

Among the utilizable halide salts, the preferred salts are those of alkali metals, such as sodium bromide, potassium bromide, potassium chloride and sodium iodide. The salts are preferably present in excess of the stoichiometric amount required.

Another process of this invention entails the chemical conversion of the same steroids listed hereinbefore to their 17-halo derivatives. This conversion is effected by reacting a 16,20-diketo steroid of the pregnane (including the pregnene, pregnadiene and pregnatriene series), unsubstituted in the 17-position, with a source of positive halogen. Although any source can be used, the preferred compounds are the N-haloamides of lower alkanoic acids and the N-haloimides of lower alkanedioic acids. Such compounds include N-bromoacetamide, N-chloroacetamide, N-chlorosuccinimide, N-bromosuccinimide and N-iodosuccinimide.

The new 17α-halo steroids of this invention include those of the pregnane series, containing keto groups in the 16 and 20 positions. The preferred compounds can be depicted by the formula:

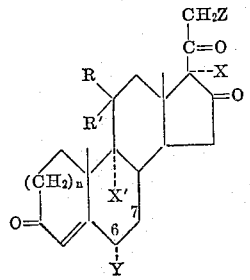

wherein the 6,7-position is saturated or double-bonded; $n$ is zero or one; R is hydrogen, R' is hydrogen or β-hydroxy, or together R and R' is keto; X is halogen (preferably bromo, chloro or iodo); X' is hydrogen or halogen (preferably fluoro); Z is hydrogen, halogen, hydroxy, or acyloxy (preferably the acyloxy radical of a hydrocarbon carboxylic acid of less than twelve carbon atoms, such as a lower alkanoic acid, lower alkenoic acid, arylcarboxylic acid, aryl(lower alkanoic) acid, cycloalkanecarboxylic acid, and cycloalkenecarboxylic acid); and Y is hydrogen, halogen (preferably chloro and fluoro), or methyl.

The 17α-halo steroids of this invention are physiologically active substances that possess progestational activity, if there is no substitution in the C-ring and hence can be used in the treatment of conditions for which progesterone is used, or glucocorticoid activity if there is a hydroxyl or keto group in the 11-position and hence can be used in the treatment of conditions for which hydrocortisone is used.

The following examples illustrate the invention (all temperatures being in centigrade):

Example 1.—16-keto-17α-bromoprogesterone

To 100 ml. of a *Caldariomyces fumago* ATCC 16373 (American Type Culture Collection, Rockville, Md.) halogenating enzyme solution, prepared by grinding 6 g. of the acetone powder of this organism with 60 g. of acid washed sand and 150 ml. of water for 5 minutes, then centrifuging and filtering, are added 4 ml. of 0.3% hydrogen peroxide, 40 ml. of 0.3 M potassium phosphate buffer (pH 3.0), 100 mg. of potassium bromide, 100 mg. of 16-ketoprogesterone in 8 ml. of dimethylsulfoxide and 48 ml. of water. The mixture is placed on a rotary shaker at 25° for 1 hour. The mixture is then extracted three times with 20 ml. portions of methyl isobutyl ketone which are combined, dried over sodium sulfate and evaporated to dryness in vacuo. The residue is then plate chromatographed using silica gel as the adsorbent and chloroform-80% methanol (50:1, v:v) as the developing solvent. The band at $R_f \approx 0.5$ detectable by u.v. light is eluted with chloroform-methanol (1:1, v:v). The eluent is then diluted with water, the chloroform separated, dried over sodium sulfate and evaporated in vacuo. Crystallization of the residue from acetone-hexane gives about 51.5 mg. of 16-keto-17α-bromoprogesterone having a melting point about 124–126°, $\lambda_{max.}^{Nujol}$ 5.70, 5.88, 5.98, 6.20μ, $\tau_{CDCl_3}^{Si(CH_3)_4}$ 4.24 (S, 4-H), 7.50 (S, 21-Me), 8.78 (S, 19-Me), 8.96 (S, 18-Me)

Example 2

Following the procedure of Example 1 but substituting 2 g. of glucose and 400 mg. of glucose oxidase (Cal. Biochem. No. 34641, 1.6 Eu/mg. protein) for the hydrogen peroxide and 0.5 M potassium acetate-acetic acid buffer (pH 5.0) for the potassium phosphate buffer, there is obtained 16-keto-17α-bromoprogesterone.

Example 3

Following the procedure of Example 1 but substituting 2 g. of L-amino acid oxidase and 400 mg. L-methionine for the hydrogen peroxide and 0.5 M potassium phosphate buffer pH 6.0 for the 0.3 M potassium phosphate buffer pH 3.0, there is obtained 16-keto-17α-bromoprogesterone.

Example 4

Following the procedure of Example 3 but substituting the same quantity of diamine oxidase for the glucose oxidase and the same quantity of histamine for the glucose, there is obtained 16-keto-17α-bromoprogesterone.

Example 5.—16-keto-17α-chloroprogesterone

Following the procedure of Example 2 but substituting potassium chloride for the potassium bromide, there is obtained about 20 mg. of 16-keto-17α-chloroprogesterone having a melting point about 155–157°, $[\alpha]_D^{22}$ —41.5° (chloroform), $\lambda_{max.}^{Nujol}$ 5.66, 5.84, 5.98, 6.19μ; $\tau_{CDCl_3}^{Si(CH_3)_4}$ 4.25 (S, 4-H), 7.61 (S, 21-Me), 8.77 (S, 19-Me), 9.00 (S, 18-Me).

*Analysis.*—Calc'd for $C_{21}H_{27}O_3Cl$ (362.88): C, 69.50; H, 7.50; Cl, 9.77. Found: C, 69.56; H, 7.48; Cl, 9.81.

Similarly following the procedures of Examples 1, 3, and 4 but substituting potassium chloride for the potassium bromide, there is obtained 16-keto-17α-chloroprogesterone.

Example 6

To a solution of 164 mg. (0.5 mmol) of 16-ketoprogesterone and 72 mg. (0.53 mmol) of N-chlorosuccinimide in 10 ml. of dioxane, 4 ml. of an acetic acid-sodium acetate buffer containing 6.6 g. of sodium acetate and 6.6 ml. of acetic acid per 100 ml. of solution are added and the mixture left at room temperature for 30 minutes. The solution is then slowly diluted with water and the crystals which separate are filtered, washed with water and dried to give about 138 mg. of 16-keto-17α-chloroprogesterone.

Example 7

Following the procedure of Example 6 but substituting an equivalent amount of N-bromosuccinimide or N-iodosuccinimide for the N-chlorosuccinimide, there are obtained 16-keto-17α-bromoprogesterone and 16-keto-17α-iodoprogesterone, respectively.

Example 8.—16-Keto-17α-bromo-A-norprogesterone (A) PREPARATION OF A-NORPREGN-3-EN-2,16,20-TRIONE To a solution of 600 mg. of 16α-hydroxy-A-norprogesterone in 150 ml. of reagent grade acetone, 8 ml. of an acetone-water (9:1, v:v) solution containing 20 mg. of CrO₃ and 32 mg. of sulfuric acid per milliliter are added dropwise with stirring. After 10 minutes a few drops of methanol are added, the mixture diluted with water and partially evaporated in vacuo. It is then extracted with chloroform which is washed with water, dried over sodium sulfate and evaporated to dryness. Crystallization of the residue from acetone-hexane gives about 400 mg. of A-norpregn-3-en-2,16,20-trione having a melting point of about 128–130°.

(B) PREPARATION OF 16-KETO-17α-BROMO-A-NORPROGESTERONE

Following the procedures of Examples 1, 2, 3, and 4 but substituting 16-keto-A-norprogesterone for the 16-keto-progesterone, there is obtained 16-keto-17α-bromo-A-norprogesterone having a melting point about 138–140°.

*Analysis.*—Calc'd for $C_{20}H_{25}O_3Br$ (393.51): C, 61.07; H, 6.41; Br, 20.32. Found: C, 61.02; H, 6.38; Br, 19.85.

*Example 9.—16-Keto-17α-chloro-A-Norprogesterone*

Following the procedure of Examples 5 and 6 and substituting 16-keto-A-norprogesterone for 16-keto-progesterone, there is obtained 16-keto-17α-chloro-A-norprogesterone having a melting point about 184–186°, $[\alpha]_D^{22} -160°$ (chloroform), $\lambda_{max.}^{Nujol}$ 5.66, 5.87, 6.14$\mu$; $\tau_{CDCl_3}^{Si(CH_3)_4}$ 4.23 (S, 4-H), 7.61 (S, 21-Me), 8.79 (S, 19-Me), 8.99 (S, 18-Me)

*Analysis.*—Calc'd for $C_{20}H_{25}O_3Cl$ (348.85): C, 68.85; H, 7.22; Cl, 10.89. Found: C, 68.82; H, 7.17; Cl, 10.63.

*Example 10*

Following the procedure of Example 7 and substituting 16-keto-A-norprogesterone for the 16-keto-progesterone, there are obtained 16-keto-17α-bromo-A-norprogesterone and 16-keto-17α-iodo-A-norprogesterone.

Similarly, any other 17-unsubstituted-16,20-diketo steroid of the pregnane series may be substituted for the 16-ketoprogesterone in the procedure of Example 1 through 7 to yield the corresponding 17α-halo-16,20-diketo derivative as the product obtained.

The invention may be variously otherwise embodied within the scope of the appended claims.

What is claimed is:

1. A process for preparing a 17α-halo-16,20-diketo steroid of the pregnane series which comprises subjecting a 17-unsubstituted 16,20-diketo steroid of the pregnane series under aerobic conditions to the action of a halogenating enzyme in the presence of hydrogen peroxide and a halide salt.

2. The process of claim 1, wherein the hydrogen peroxide is prepared in situ by the action of a peroxide producing enzyme system.

3. The process of claim 2, wherein the hydrogen peroxide producing enzyme system is glucose oxidase plus glucose.

4. The process of claim 1 wherein the halogenating enzyme is obtained from *Caldariomyces fumago*.

5. The process of claim 4 wherein the steroid is 16-keto-progesterone.

6. The process of claim 4 wherein the steroid is 16-keto-A-norprogesterone.

7. The process of claim 1 wherein the halide salt is an alkali metal halide.

8. The process of claim 1 wherein the halide salt is potassium chloride.

9. The process of claim 1 wherein the halide salt is potassium bromide.

10. A compound of the formula

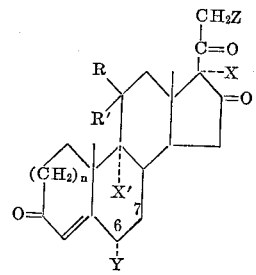

wherein the 6,7-position is saturated or double-bonded; n is selected from the group consisting of zero and one; R is hydrogen, R' is selected from the group consisting of hydrogen and β-hydroxy, and together R and R' is keto; X is halogen; X' is selected from the group consisting of hydrogen and halogen; Z is selected from the group consisting of hydrogen, halogen, hydroxy and the acyloxy radical of a hydrocarbon carboxylic acid of less than twelve carbon atoms; and Y is selected from the group consisting of hydrogen, halogen and methyl.

11. 16-Keto-17α-haloprogesterone.
12. 16-Keto-17α-chloroprogesterone.
13. 16-Keto-17α-bromoprogesterone.
14. 16-Keto-17α-halo-A-norprogesterone.
15. 16-Keto-17α-chloro-A-norprogesterone.
16. 16-Keto-17α-bromo-A-norprogesterone.

References Cited

UNITED STATES PATENTS

| | | | |
|---|---|---|---|
| 2,684,963 | 7/1954 | Schock et al. | 260—239.55 |
| 3,008,879 | 11/1961 | Harvill | 195—103.5 |
| 3,013,032 | 12/1961 | Nathan | 260—397.45 |

OTHER REFERENCES

Beckwith et al., J. Biol. Chem., 238, 3091–3094. (1963).

LEWIS GOTTS, *Primary Examiner.*

JAMES O. THOMAS, *Examiner.*

T. M. MESHBESHER, *Assistant Examiner.*